United States Patent [19]

Roullet et al.

[11] Patent Number: 4,544,698
[45] Date of Patent: Oct. 1, 1985

[54] POLYMER COATING COMPOSITION AND ITS USE IN THE MANUFACTURE OF LAYERED PACKAGING

[75] Inventors: Gilbert Roullet, Tremblay les Gonesse; Pierre Legrand, Antony, both of France

[73] Assignee: Rhone-Poulenc Industries, Paris, France

[21] Appl. No.: 252,357

[22] Filed: Apr. 9, 1981

Related U.S. Application Data

[63] Continuation of Ser. No. 158,900, Jun. 12, 1980, abandoned, which is a continuation of Ser. No. 10,217, Feb. 8, 1979, abandoned.

[30] Foreign Application Priority Data

Feb. 13, 1978 [FR] France .................................. 78 03940

[51] Int. Cl.$^4$ ............................................. C08L 29/04
[52] U.S. Cl. ..................................................... 524/503
[58] Field of Search ............. 260/29.6 WA, 29.6 WB, 260/, 29.7 WA

[56] References Cited

U.S. PATENT DOCUMENTS

| | | | |
|---|---|---|---|
| 3,573,236 | 3/1971 | Barlow ...................... | 260/29.6 WA |
| 3,714,086 | 1/1973 | Schaefer .................... | 260/29.7 WA |
| 3,801,675 | 4/1974 | Russell ...................... | 260/29.6 WB |
| 3,931,088 | 1/1976 | Sakurada ................... | 260/29.6 WA |

*Primary Examiner*—Paul R. Michl
*Attorney, Agent, or Firm*—McDougall, Hersh & Scott

[57] ABSTRACT

The invention pertains to the field of packaging and to a coating composition composed of a polyvinyl alcohol solution and a polymer latex for imparting gas and flavor tight packaging.

6 Claims, No Drawings

POLYMER COATING COMPOSITION AND ITS USE IN THE MANUFACTURE OF LAYERED PACKAGING

This is a continuation of application Ser. No. 158,900, filed June 12, 1980, abandoned, as a continuation of application Ser. No. 10,217, filed Feb. 8, 1979 (now abandoned).

This invention relates to polyvinyl alcohol-polymer latex base compositions used as coating agents in the manufacture of packaging materials displaying excellent gas and flavor tightness and good moisture resistance.

By packaging materials it is meant, according to the present description, films, sheets, tubular films, blown or molded hollow bodies, bottles, receptacles and the like.

Most thermoplastic polymers which are generally used in the preparation of these articles are much too gas and flavor permeable, which can make them unsuitable for usage in the packaging and preservation of very flavored and/or oxygen sensitive products, carbonated drinks, etc.

Polyvinyl alcohol and its copolymers having large quantities of hydroxyl groups are known to display very low gas permeability. Yet, their usage is limited as coating agents on polymer substrates for packaging because, due to their hydroxyl function, they are water sensitive. Moisture may act to cause staining or wear due to friction, an unpleasant feel to the touch and a dull appearance. Furthermore, it is known that the gas permeability of polyvinyl alcohol increases in proportion to its moisture content.

The invention pertains to a coating composition for packaging objects.

The invention also pertains to the use of the composition in the manufacture of layered packaging.

The invention furthermore pertains to oriented, packaging objects produced by drawing a substrate which has been coated by the composition.

The coating composition according to the invention is characterized in that it is composed of an aqueous solution of a polyvinyl, alcohol and a water insensitive polymer latex, such that the polyvinyl alcohol/latex polymer ratio, expressed by weight of dry material, is comprised between 0.4 and 3.

The polyvinyl alcohols which can satisfactorily be used in the invention are available commercially. They can either be used as they are or they can be prepared by hydrolysis of a vinyl polyester. Preferably, the polyvinyl alcohol is selected to contain more than 90% and advantageously more than 97% vinyl alcohol moieties with respect to monomer units. Vinyl polyesters can be illustrated in particular by vinyl polyacetates and their copolymers rich in acetate such as ethylene vinyl acetate copolymers containing less than 10% ethylene units. Polyvinyl alcohols with less than 90% —$CH_2OH$ patterns can be used, but they offer less gastightness and are more moisture sensitive.

It is interesting to note that the water vapor sensitivity of polyvinyl alcohol base coatings is partially suppressed when these alcohols are mixed with moisture insensitive polymer latexes.

The molecular weight of the polyvinyl alcohol is not particularly critical. It is selected with respect to the coating thickness desired and to the degree of moisture to which the packaging will be subjected during utilization. Although a low molecular weight product can be used economically to give relatively thick deposits, a high molecular weight product gives better protection. In general, the preferred polyvinyl alcohols are those with a viscosity lower than 20 cp (viscosity of a solution at 4% in water) and more specifically between 2 and 10 cp, and with an ester index between 2 and 150, and preferably lower than 20.

The following can be cited as examples of polymer latexes which are used in combination with polyvinyl alcohol and which are water vapor insensitive and water vapor tight: styrene-butadiene base or styrene-alkyl acrylate base latexes with a high styrene ratio, consisting preferably of more than 60% styrene moieties; unsaturated carboxylic acid aryl or alkyl ester base latexes such as acrylates or methacrylates, unsaturated nitrile base latexes, such as acrylonitrile and methacrylonitrile; vinyl halogenide base latexes such as vinyl chloride, vinyl bromide and vinylidene chloride; vinyl acetate base latexes. Vinylidene polychloride latexes are particularly advantageous because they contribute to gas tightness, provide good adhesiveness and have a good appearance. It is preferable that the vinylidene chloride content of the copolymers be higher than approximately 80% in moles, the other monomers possibly being, for example, vinyl chloride, acrylates or methacrylates, unsaturated orgaic acids such as acrylic, itaconic or fumaric acids.

The term latex is well known to the specialists and is used to designate a fine dispersion of polymer in a continuous phase composed generally of water. Although the polymer particles can be any appropriate size, they are generally comprised between 0.05 and 5$\mu$. The percentage of dry material in the latex is, in practice, approximately between 40 and 60% by weight.

In order to provide the adequate gastightness and resistance to water vapor, the polyvinyl alcohol/latex polymer ratio by weight of dry material of the composition according to the invention should be between 0.4 and 3. Within these limits, the ratio is selected with respect to the degree of watertightness and protection from water desired as well as with respect to the nature of the substrate, the desired grammage and the appearance of the final object. An advantage of vinylidene chloride polymers and copolymers is their transparency and brilliancy, these characteristics being especially desirable for films and receptacles designed for food packaging. Furthermore, they help provide gastightness of the support. For this couple of polymers, polyvinyl alcohol/vinylidene chloride polymers and copolymers, the preferred ratios expressed in dry material are between 0.6 and 1.4, and more particularly between 0.9 and 1.2. If ratios higher than 1.4 are used, the coating shows great water sensitivity; if ratios less than 0.6 are used, transparency is affected and gas permeability is greater.

It is obvious that mixtures of two or more polymer latexes can be used in the present invention in combination with polyvinyl alcohol which also can be composed of a mixture of polyvinyl alcohols differing in molecular weight and the number of hydroxyl functions.

The polyvinyl alcohol and latex constituents may be easily mixed by slow stirring, from a previously prepared 5-20% by weight polyvinyl alcohol aqueous solution and the latex or latexes, in the presence if need be of a small quantity of anti-foam or surface-active agents. The compositions may also contain emulsifiers, plasticizers, anti-oxidants, anti-static agents, bactericides and fungicides, sliding agents, loads, colorants, pigments and cross-linking agents.

The compositions according to the invention are particularly useful as coating materials applicable onto substrates formed of thermoplastic materials transformable by a molding method, possibly involving a monoaxial or bi-axial drawing stage. The manufacture of sheets or films by extruding a perceptibly amorphous, melted thermoplastic material, drawing the film lengthwise, then crosswise and inversely is a known process. The coating composition can then be applied by any known method such as soaking, pulverization, roller coating or scraper depositing, on one or both sides of the film before or after drawing, or for example between lengthwise drawing and crosswise drawing.

There is also the known process of preparing bioriented hollow objects by a bi-axial drawing-blowing process according to which a preform is axially drawn in a mold and simultaneously or successively expanded by blowing with a gas. The coating composition can be applied on one or both sides of the preform. Alternately, it can be applied on the walls of a tube leaving an extrusion device or even on the walls of a parison.

The thermoplastic materials used to support the coating compositions include, for example, polyolefins such as high and low density polyethylene and polypropylene, polystyrene and copolymers of styrene and acrylonitrile, vinyl polychloride, its copolymers, polycarbonates, polyacetals, polyamides and polyesters such as glycol polyterephtalates. To promote wetting and adhesion, a preliminary surface treatment can be performed such as Corona discharge, flame treating or the application of a "primer".

It is entirely unexpected, especially when the coating process is performed before drawing, that a combination of polyvinyl alcohol and polymer latex, such as defined in the invention and which are incompatible a priori, would adhere satisfactorily to the substrate and not cause "delamination" and/or cracks. It is equally surprising that by suitably choosing the nature of the latex and its proportions with respect to the polyvinyl alcohol, it would be possible to obtain, after drying and drawing, layered objects with excellent transparency and brilliancy, and that from the point of view of gas-tightness, the advantages of both the polyvinyl alcohol and the latex polymer could be combined without having any of their disadvantages.

The applicant discovered that this group of favorable characteristics is obtained because of the particular two-phase structure of the coating obtained after phase inversion during drying. This two-phase structure is believed to be formed of a fine dispersion of polyvinyl alcohol occluded in a watertight polymer matrix. This structure can be improved in the case where bi-orientation of the support—coating group is carried out. In this case, the fine, perceptibly spheric particles of polyvinyl alcohol resemble a laminar shape particularly adequate for proofing.

The choice of the latex or latexes and of the polyvinyl alcohol or alcohols, be it with respect to their nature, concentration in dry material and relative proportions as well as to the drying and drawing conditions used, greatly influences the phase inversion process and the formation of the proper two-phase structure, and consequently the properties of the coating, its appearance (transparency and brilliancy), its adhesiveness to the substrate, its resistance to streaking, its gas and vapor tightness, as well as the preservation of these characteristics during significant variations in ambient moisture.

At the beginning of drying and for the longest time possible during this stage, it is indispensable to have a two-phase system in which the continuous phase is composed in substance of water (possibly containing hydrosoluble adjuvants in small proportions) and dissolved polyvinyl alcohol, the dispersed phase being composed essentially of particles of the latex polymer or polymers. The phases must, in effect, coalesce and phase inversion should take place as late as possible, especially if the latex polymer is highly watertight or water impervious.

Hot air devices or infrared radiation devices with determined wave lengths may be used as drying means. According to the compositions, drawing of the coating and the formation of bi-oriented polyvinyl alcohol sheets can be facilitated by partial drying only, for example, until reaching a moisture content between 0.5 and 5%, the residual water then subsequently being eliminated, for example, on the finished product.

An improvement of the process according to the invention consists in subjecting the finished object to a post heat treatment for a few seconds at a temperature between 80° and 200° C. This post-treatment can occur twice, first at a temperature between 150° and 200° C., and then at a temperature which favorizes the crystallization of the latex polymer.

Although it is possible, by appropriately selecting the proportions and the nature of the constituents of the mixture, to carry out the coating process by applying a single coat to give the finished objects the sufficient qualities of gas and flavor tightness, even in the presence of a very humid atmosphere, it is of course possible, as well as desirable in certain cases, to apply up to several successive coats with the same composition or with compositions differing in the rate, nature or proportions of the constituents.

The following examples are given by way of illustration of the invention, and not by way of limitation:

EXAMPLE 1

A glycol ethylene polyterephtalate with an intrinsic viscosity of 0.8 dl/g is injection molded into a preform having a length of 160 mm, an outer diameter of 24.8 mm and a wall thickness of 3.2 mm.

A coating composition is prepared, consisting of x parts of an aqueous solution containing 19% by weight polyvinyl alcohol (Brand RHODOVIOL 4–20 of Rhone-Poulenc) and y parts of a 50% dry extract vinylidene chloride copolymer latex (Brand IXAN WA 91-C of Solvay).

The outside of the preform is surface treated by the Corona effect and then is dipped into a vat containing the above composition; the immersion depth is 145±2 mm and the immersion time is 5 seconds.

The bath temperature is maintained at 35° C.

The preform is then drained and dried by infrared radiation (average wave length 2μ) and hot air for 3 minutes, the temperature of the coating increasing from 35° to 125° C.

The coated preform is transformed into a 1.5 liter bottle biaxially oriented after heating to 105° C. by simultaneous drawing and blowing in a mold, the walls of which are maintained at 40° C.

The x/y ratio of the coating composition is varied and coating thickness and oxygen permeability are measured on the straight, cylindrical part of the bottle in dry gas and 45% relative humidity.

Oxygen permeability is measured by mass spectrometry under the following conditions: the coated side of the sample is in contact with dry or moist gas, the other side under vacuum is attached to the mass spectrometer which measures gas flow through the sample.

The results are expressed in $\frac{cm^3 \cdot cm}{cm^2 \cdot S \cdot cmHg} \times 10^{12}$ As comparison a bottle is manufactured under the same conditions but from an uncoated preform.

TABLE 1

| x/y | 68/32 | 72.5/27.5 | 76/24 | Comparative Sample |
|---|---|---|---|---|
| Thickness of coating in microns | 3.9 | 3.9 | 3.5 | — |
| P(O$_2$) at 40° C. and 0% R.H. under 3 bars | 1.2 | 1.25 | 1 | 6.5 |
| P(O$_2$) at 40° C. and 45% R.H. under 3 bars | 1.3 | 1.2 | 1.2 | 5.8 |

If, the same coating thickness from a latex of the same vinylidene chloride polymer is desired, it would be necessary to apply 4 successive coats.

The bottles with the coating allow for a fruit drink to be stored 8 months without a change in taste in an atmosphere at 15°–30° C. and 50–75% relative humidity, as compared to 2½ months for the comparative sample bottle. Abrasion resistance is excellent.

EXAMPLE 2

Example 1 is repeated with these differences: the preform is coated in two successive layers and the ratios in dry material of polyvinyl alcohol (PVA) to latex polymer (VC2) are varied.

Polyvinyl alcohol:brand RHODOVIOL 4-20
Vinylidene chloride copolymer latex:brand IXAN WA 35

The results of permeability to oxygen are given in Table 2.

TABLE 2

| PVA/VC2 | | Thickness | P(O$_2$) at 40° C. and 0% R.H. under 3 bars | P(O$_2$) at 40° C. and 45% R.H. under 3 bars |
|---|---|---|---|---|
| 1st coat | 2nd coat | | | |
| 1.6 | 0.8 | 4.3 | 1.2 | 1 |
| 1.2 | 1.2 | 2.9 | 0.35 | 0.46 |
| 0.8 | 0.8 | 3 | 2.4 | 2 |
| 1.6 | 1.6 | 2.8 | 0.32 | 0.8 |

EXAMPLE 3

A 150 micron thick, glycol ethylene polyterephtalate film is extruded in a flat drawplate.

The film is cooled to 95° C. and, by means of rollers, is drawn to 3.5 times its length.

On one side of the film, by means of an air doctor, a coating obtained from a composition composed of a 12% polyvinyl alcohol solution (RHODOVIOL 4-20) and a 50% dry extract vinylidene chloride copolymer latex (IXAN W 91 C) is applied: the polyvinyl alcohol/latex polymer ratio in dry material is 1:7. The coating is dried by passing the coated film under infrared lamps, the temperature of the coating being progressively increased to 140° C. A coating weight of 10 g/m$^2$ is obtained. Cooling takes place at 95° C. and the film is drawn 3.5 times crosswise on the BRUCKNER machine. A heat treatment is carried out for 2 seconds at 95° C. After cooling to 40° C. by a cold air blast, the film is wound.

The film obtained is thermobondable and exhibits excellent optical characteristics. Its total thickness is 14 microns with a coating of approximately 2.5 microns.

Oxygen permeability at 45% relative humidity is 3 times lower than that of a film obtained under the same conditions but with a vinylidene polychloride coating of the same thickness which, in addition, requires two successive deposits.

We claim:

1. A composition which, upon drying, provides a moisture resistant, gas and flavor tight coating for use in a packaging material, said composition consisting essentially of an aqueous solution of polyvinyl alcohol containing more than 90% (—CH$_2$OH) groups, a viscosity of less than 20 cp (in solution at 4% water) and an ester index between 2 and 150, and a latex of a water insensitive polymer incompatible with the polyvinyl alcohol selected from the group consisting of vinylidene chloride polymer latexes, the ratio of polyvinyl alcohol to latex polymer expressed by weight of dry material being between 0.4 and 3, said compositions being characterized by inversion to a two-phase coating upon drying in which the water insensitive latex polymer forms a continuous phase and the polyvinyl alcohol forms a discontinuous phase.

2. Composition as claimed in claim 1, in which the viscosity of the polyvinyl alcohol is between 2 and 10 cp.

3. Composition as claimed in claim 1, in which the ester index of the polyvinyl alcohol is less than 20.

4. Composition as claimed in claim 1, in which a latex mixture of water insensitive polymers is used.

5. Composition as claimed in claim 1, in which the polyvinyl alcohol/vinylidene chloride copolymer ratio by weight of dry material is between 0.6 and 1.4.

6. Process of preparing a coating composition as claimed in claim 1 comprising mixing an aqueous solution of polyvinyl alcohol of between 5 and 20% by weight with one or more water insensitive polymer latexes, the dry material content of which is between 40 and 60% by weight.

* * * * *

UNITED STATES PATENT AND TRADEMARK OFFICE
CERTIFICATE OF CORRECTION

PATENT NO. : 4,544,698

DATED : October 1, 1985

INVENTOR(S) : Gilbert Roullet and Pierre Legrand

It is certified that error appears in the above-identified patent and that said Letters Patent is hereby corrected as shown below:

IN THE SPECIFICATION

Column 6, line 8, "1:7" should read -- 1:1 --.

Signed and Sealed this

Twenty-first Day of January 1986

[SEAL]

Attest:

DONALD J. QUIGG

Attesting Officer     Commissioner of Patents and Trademarks